United States Patent Office 2,950,981
Patented Aug. 30, 1960

2,950,981

NACREOUS PIGMENT AND PROCESS OF PREPARING SAME

Harold A. Miller, Forest Hills, and Leon M. Greenstein, New York, N.Y., assignors to Francis Earle Laboratories, Inc., Peekskill, N.Y., a corporation of New York No Drawing. Filed Apr. 10, 1957, Ser. No. 651,809

14 Claims. (Cl. 106—194)

This invention relates to nacreous or pearlescent pigments. More specifically, it relates to a new crystalline basic lead carbonate pigment and process for preparing the same. The pigment herein contemplated is of such quality that it surpasses natural pearl essence in brilliance and luster.

Although synthetic pearlescent or nacreous pigments are known to the prior art including a form of basic lead carbonate described in United States Patent No. 2,097,269, all have fallen far short of natural pearl essence in brilliance.

Accordingly, it is an object of this invention to provide a new basic lead carbonate nacreous pigment which has a pearlescent quality far superior to previously known basic lead carbonate or indeed any known synthetic nacreous pigment in pearlescent quality.

It is a further object of this invention to provide a synthetic nacreous pigment fully equivalent to the expensive natural pearl essence.

A further object is to provide a process for preparing such pigment.

Other objects of this invention will be apparent from the description which follows:

The term "pearl essence" refers to a composition prepared from the minute guanine crystals which are found in fish, the crystals usually being suspended in a liquid or paste vehicle. The best quality pearl essence makes use of crystals from the scale of various fish of the herring family, particularly Clupea harengus. In commercial practice the scales are collected in large quantity and treated with aqueous solutions or solvents which cause the microscopic guanine crystals to become detached from the membrane in which they are imbedded. These crystals are then submitted to lengthy washing procedures which remove the natural fish oils and proteinaceous materials, and are finally incorporated in a vehicle suitable for the application in which the pearl essence is to be used. For example, nitrocellulose lacquer is the common vehicle for a pearl essence to be used in making simulated pearls; a plasticizer like dibutyl phthalate is a convenient vehicle for a pearl essence to be incorporated within a plastic material, such as methyl methacrylate. The low yield from the raw materials, the large bulk which must be handled, and the length of the procedures make natural pearl essence a very expensive product.

The pearl essence crystals are very thin platelets in the form of elongated hexagons with, preferably, a length of 10 to 60 microns ($\mu$), a width of 2 to $20\mu$, and a thickness of 20 to 80 millimicrons ($m\mu$). The surfaces of these crystals are extremely smooth. Although crystals outside this range of sizes are found, primarily in having widths under $2\mu$, such crystals do not have optimum luster, and the most superior crystals fall within the ranges designated. When applied to a surface or incorporated in a plastic body, such crystals can be oriented parallel to one another because of their shape. Their high indices of refraction make the crystals highly reflective and the effect of pearly lustre is achieved as light reaches the eye simultaneously from very many reflecting layers.

The optical properties of pearl essence are thus determined by crystal shape and indices of refraction, and similar optical effects may be demonstrated by other substances such as lead hydrogen phosphate and basic lead carbonate which resemble natural guanine crystals in these characteristics. Prior to the present invention these synthetic materials have resembled natural pearl essence qualitatively in that they produce pearly luster, but have not at all approached the quantitative degree of luster of the natural product.

The luster of pearl essence is commonly measured by a visual comparison of beads which have been coated with the nacreous pigment. A standard procedure is as follows:

The pigment suspension is carefully dispersed in a nitrocellulose dipping lacquer. The concentration is such that the volume percentage of crystals in the lacquer dispersion is 0.25 percent. It should be understood that since various pigments differ in their specific gravities, the weight concentration of crystals in the lacquer will vary according to the pigment tested. Using this volume concentration, the actual weight concentration of nacreous crystals in the final dipping lacquer is about 0.5 percent in the case of guanine crystals and 1.6 percent in the case of the more dense inorganic synthetic nacreous crystals.

A standard dipping lacquer is composed of:

|  | Lbs. |
|---|---|
| 15/20 second RS nitrocellulose | 5.0 |
| 30/40 second RS nitrocellulose | 11.0 |
| Ethyl alcohol | 8.5 |
| Amyl acetate | 75 |
| n-Butyl acetate | 105 |

The viscosity of this lacquer is 800 centipoises at 25° C.

Care must be taken in dispersing the nacreous suspension or paste in dipping lacquer. It is preferable to add the latter to the pearl essence or synthetic "pearl essence" a little bit at a time, with stirring after each addition, in order to assure dispersion of each of the plate-like crystals.

In the dipping test method alabaster glass beads of 7 mm. diameter are attached to toothpicks and suspended vertically downwards. The beads are then lowered mechanically into the pearlescent nitrocellulose lacquer suspension until the beads are completely submerged, and then the beads are pulled up and out of the lacquer. The rate of movement of the bead is 0.5 inch per minute. The excess lacquer which adheres to the bottom of the bead in the form of a drop is removed by tapping the bottom of the bead against a piece of paper. Each bead is then mounted on a rotating drum for air drying; after an hour the beads are re-dipped, and this process is repeated until the beads have four coatings. The dippings of beads which are to be graded are visually compared, preferably in diffuse north light, with standard dippings prepared at the same time from pearl essences of known quality. The properties observed are luster or brilliance, depth, covering power, and color.

In this method it is essential that the standards be dipped under identical conditions as the unknowns. The dipping concentrations given above give the maximum luster. A further increase in crystal concentration does not improve the quality of the dipping, but causes instead a clouding or "muddying" of the pearl effect.

The highest quality pear essence commercially available has a luster numerically graded at about 700. A lower grade of pearl essence has a luster of 600; basic lead carbonate made in accordance with United States Patent No. 2,097,269, 25–50; lead hydrogen arsenate, 50–100; and lead hydrogen phosphate, 20–50. The basic lead carbonate to be described herein yields a luster of a dipping grade greater than 650 and generally in the range of about 650 to 1000, and thus has a luster at least as great as that of natural pearl essence.

The lead carbonate nacreous crystals which result from prior art procedures are hexagonal plates with diameters (measured from point to opposite point) considerably smaller than natural pearl essence crystals and often as small as 1–2 microns. The crystal surfaces are marred by irregular growth, overgrowths and adhesion of crystal fragments.

It has been found that marked improvement in crystal perfection and, therefore, in the quality of the material as a nacreous pigment can be achieved by precipitating the crystals from solutions of lead oxide (PbO) in organic acids of higher molecular weight than acetic acid, i.e. having at least three carbon atoms. These acids must be water soluble and must have water soluble lead salts. They have the general formula—

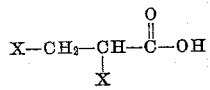

where X is a member from the group consisting of hydrogen, methyl and halogen and would include monobasic carboxylic acids having three to four carbon atoms such as propionic acid, n-butyric acid, iso-butyric acid, alpha-chloropropionic acid, and beta-chloropropionic acid.

In the present process the lead content of the solution is maintained preferably between 0.5 and 5.0 percent. It is further important that the water used for making up the solution be of a high degree of purity, e.g. of a hardness less than 100 parts per million (p.p.m.) of calcium carbonate, preferably below 50 p.p.m. and substantially free of organic contaminants. Distilled water may be used, as well as water prepared by the use of demineralizing resins and activated carbon.

The solutions are filtered with the aid of a filter-aid such as diatomaceous earth just before precipitation is to take place. The filtration is facilitated by permitting the blended ingredients to stand prior to filtration, in order to permit small solid particles to grow or coalesce to larger size before the filtration begins. Periods of time of at least three hours are suitable. Filtration is important since the presence of very slight amounts of solid material can greatly affect the formation of and the growth of the desired basic lead carbonate crystals.

The crystals are formed by bubbling carbon dioxide gas into the agitated solution of basic lead salt. Crystals of the desired properties can be obtained at precipitation temperatures from 10° C. to 80° C.; inasmuch as desirable results can be obtained from 20° C. to 30° C., it is generally preferred to use temperautres within this more convenient range. Carbon dioxide is added until the pH value falls to 6.5; further addition would tend to cause the precipitation of an undesirable form of lead carbonate.

The crystals precipitated by this procedure may vary between 3 and 50μ in diameter (measured from point to opposite point), and from 10 to 50mμ in thickness, the particular dimensions depending on the specific conditions of the precipitation. The surfaces of these crystals are smooth and entirely free of adhering crystal fragments or uneven overgrowths. They are very similar in size and in surface perfection to the natural pearl essence crystals described above, except that they have a regular hexagonal shape.

One result of the degree of perfection of these crystals is that they do not permit concentration and washing by means of filtration techniques as do those known to the prior art; they cannot be filtered because they leaf on the filter cloth or other filtering medium, the plate-like crystals packing so close together that the film of crystals becomes practically impervious to the passage of further liquid. Since filtration is not feasible, the washing is accomplished by other common separation techniques, such as decantation or centrifugation.

Another consequence of the high degree of crystal perfection is their tendency to agglomerate with one another as the smooth faces come together, particularly in aqueous suspension, if the solution does not contain some substance which tends to adsorb onto the crystal surfaces to form a protective film. During the precipitation, excess lead salt of the organic acids performs this function. It is important that the excess must not be washed out with water, lest this agglomeration occurs. The crystals are, therefore, washed with a solvent which is miscible with both water and the desired organic vehicles, and which is also a solvent in the presence of water, for the lead salts of the organic acids used.

Suitable solvents include isopropanol, ethanol, methyl ethyl ketone, ethylene glycol monomethyl ether, ethylene glycol monoethyl ether, methyl acetate, and other common alcohols, ketones and esters.

Crystals which have been separated from the aqueous mother liquor and have been dehydrated by the use of one of these solvents can then be incorporated in the desired organic vehicle for grading and for the various uses described above. These points will be illustrated in the following examples.

*Example I*

To 200 gallons of distilled water are added 10.0 lbs. of propionic acid. To the stirring solution are added 45 lbs. of lead oxide (PbO). After the lead oxide has dissolved, the basic lead propionate solution is allowed to stand overnight and is then filtered using diatomaceous earth to remove any insoluble compounds which may be present as well as any basic lead carbonate crystals which may have formed. With the clear filtrate at 25° C., $CO_2$ is introduced into the stirring solution. The pH value, which is originally at about 8.0, falls with the addition of $CO_2$, the addition being terminated when the pH reaches 6.5. The $CO_2$ addition period is approximately six hours.

The crystals are then permitted to settle. The clear supernatant liquid is removed, and the concentrated slurry transferred to a contrifuge to remove additional water. The residue from the centrifuge is re-slurried in isopropanol several times in order to remove the remainder of the water.

The crystal paste at this point contains approximately 70 percent crystals and is diluted with nitrocellulose lacquer to bring the crystal content to 35 percent by weight. The crystals are clean hexagonal plates ranging from 15 to 30μ (microns) in diameter and it is evident from electron micrographs, that they have a thickness of approximately 25 mμ (millimicrons). The dipping grade in the standard test described above is 950.

*Example II*

To 100 gallons of distilled water at 60° C. is added 5.0 lbs. of beta-chloropropionic acid, followed by 15.2 lbs. of lead oxide. The suspension is stirred for three hours and is then filtered with filter-aid. With the temperature maintained at 60° carbon dioxide gas is bubbled into the stirring solution of basic lead beta-chloropropionate. The gas is introduced at such a rate that the pH value falls from approximately 8.0 initially to approximately 6.5 in about 3.0 hours.

The crystals are allowed to settle overnight, after which the supernatant liquid is removed as completely as possible. An excess of the monomethyl ether of ethylene glycol is added to the crystals, which are again allowed to settle out. The washing procedure is repeated until satisfactory removal of water has been obtained, and the crystals finally allowed to settle to a concentration of about 60 percent. The slurry is brought to 35 percent crystal content with dibutyl phthalate. The preparation gives a grade of 800 in the standard dipping test. The crystals are in the form of clean hexagons varying from 10 to 40μ in diameter and being approximately 30mμ in thickness.

*Example III*

To 200 gallons of de-mineralized water at 15° C. (hardness equivalent to 2 p.p.m. as calcium carbonate) are added 3.0 lbs. of isobutyric acid. To the stirring solution are added 11.3 lbs. of lead oxide. After standing overnight, the basic lead isobutyrate solution is filtered using filter-aid; basic lead carbonate crystals are precipitated from the solution at 15° C. over a seven hour period. The crystals are transferred into nitrocellulose lacquer as described above. They give a standard dipping grade of 750, and measure 10 to 20μ in diameter and 40 mμ in thickness.

*Example IV*

Following the procedure as set forth in Example III above n-butyric acid is substituted for the isobutryic acid therein referred to.

The resulting crystals give a standard dipping grade of 800, and measure 10 to 30μ in diameter and 30mμ in thickness.

It is to be understood that the various acids herein referred to may be used singly or in combination with each other. Moreover, minor amounts of acetic acid, generally not exceeding 40 percent, may be admixed therewith without deleteriously affecting the quality of the crystal.

The superiority in terms of pearlescent characteristics of the crystals produced in accordance with these procedures arises both from the use of the basic lead salts of acids of propionic and butyric acids and their derivatives and from improvements in operating procedure such as careful filtration, the importance of which has already been discussed. Without wishing to be bound by a particular mechanism for the action of the acids, it is believed that the improvement is effected at least in part, by the greater surface-activity of these acids.

The fact that the lead salts of these acids or possibly the acid anions themselves are adsorbed by the crystals is shown by their stabilizing the crystal dispersion; as was mentioned above, removal of the excess lead salts cause the crystals to agglomerate in aqueous suspension. It is probable that the degree of adsorption to the crystal also increases with increasing molecular weight, and that it is this increased adsorption which causes the crystal to grow smoothly, with surfaces protected against irregular growth or adhesion of crystal fragments or particles of impurities.

The form in which the nacreous lead carbonate pigment is commonly prepared is that of a paste which contains as the vehicle thereof, a light-transmitting, preferably clear liquid which is compatible with lacquers, resins, and plastics into which the pigment may be ultimately incorporated. Generally, the pigment is present in amounts between about 20 and 50 percent by weight.

For surface coating, the lead carbonate nacreous pigments of the present invention can be suspended in a cellulose nitrate lacquer. However, there may be substituted almost any clear lacquer formula as the vehicle for either of the pigments. Generally, a translucent or transparent plastic material such as cellulose acetate, the alkyd resins, the vinyl resins, as well as the acrylic acid ester resins are found to be quite useful.

In the foregoing the invention has been described only in connection with preferred embodiments thereof. Many variations and modifications of the principles of the invention within the scope of the description herein are obvious. Accordingly, it is preferred that this invention be bound not by the specific disclosure herein, but only by the appending claims.

We claim:

1. A nacreous pigment having, as a nacre-producing substance therein, basic lead carbonate in the form of hexagonal crystal platelets of a diameter of from about 3 to 50 microns, a thickness of from about 10 to 50 millimicrons, and having a luster at least as great as that of natural pearl essence, the luster being above about 650 as determined by a standard dipping test.

2. A nacreous pigment having, as a nacre-producing substnce therein, basic lead carbonate in the form of hexagonal crystal platelets of a diameter of from about 3 to 50 microns, a thickness of from about 10 to 50 millimicrons, and having a luster at least as great as that of natural pearl essence and in the range of about 650 to 1000 as determined by a standard dipping test performed in a nitrocellulose-containing dipping lacquer, the surfaces thereof being smooth and substantially free of adhering crystal fragments and uneven overgrowths.

3. A nacreous composition comprising a light-transmitting organic vehicle having suspended therein as a nacre-producing substance a nacreous pigment of basic lead carbonate in the form of hexagonal crystal platelets of a diameter of from about 3 to 50 microns, a thickness of from about 10 to 50 millimicrons, and having a luster at least as great as that of natural pearl essence and above about 650 as determined by a standard dipping test, the surfaces thereof being smooth and substantially free of adhering crystal fragments and uneven overgrowths.

4. The composition of claim 3 in which the light-transmitting vehicle contains between about 20 and 50 percent by weight of the pigment.

5. The composition of claim 4 in which the vehicle is a nitrocellulose lacquer.

6. The process of preparing a basic lead carbonate pigment which comprises forming an aqueous solution of PbO containing 0.5 to 5.0 percent lead in a water-soluble organic acid having the general formula—

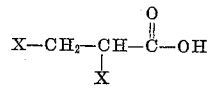

where X is a member from the group consisting of hydrogen, methyl, and halogen, treating said solution to remove any solid material suspended therein and then passing carbon dioxide gas through the agitated solution maintained between 10° C. and 80° C. thereby precipitating basic lead carbonate crystals in the form of hexagonal crystal platelets having a luster at least as great as that of natural pearl essence.

7. The process of preparing a basic lead carbonate pigment which comprises forming an aqueous solution of PbO containing 0.5 to 5.0 percent lead in a water soluble organic acid having the general formula—

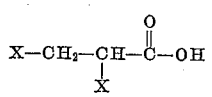

where X is a member from the group consisting of hydrogen, methyl, and halogen, treating said solution to remove any solid material suspended therein and then passing carbon dioxide gas through the agitated solution maintained between 10° C. and 80° C. until the pH thereof falls to a value of about 6.5, thereby forming a lead carbonate pigment in the form of hexagonal crystal platelets having a luster at least as great as that of natural pearl essence.

8. The process as set forth in claim 7 in which the water for the lead oxide solution is substantially free of organic contaminants and has a hardness of less than 100 p.p.m. as calcium carbonate.

9. The process of preparing a basic lead carbonate pigment which comprises forming an aqueous solution of PbO containing 0.5 to 5.0 percent lead in a water soluble organic acid having the general formula—

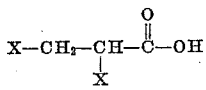

where X is a member from the group consisting of hydrogen, methyl, and halogen, filtering said solution to remove any solid material suspended therein and then passing carbon dioxide gas through the agitated solution maintained between 10° C. and 80° C. until the pH thereof falls to a value of about 6.5, thereby precipitating basic lead carbonate in the form of hexagonal crystal platelets, washing said crystals with a water-miscible solvent for lead salts of said organic acids, dehydrating the said crystals, the said crystals forming a pigment having a luster at least as great as that of natural pearl essence and above about 650 as determined by a standard dipping test in a nitrocellulose-containing dipping lacquer.

10. The process as set forth in claim 9 in which the acid is propionic acid.

11. The process as set forth in claim 9 in which the acid is beta-chloropropionic acid.

12. The process as set forth in claim 9 in which the acid is isobutyric acid.

13. The process as set forth in claim 9 in which the acid is n-butyric acid.

14. The process of preparing a basic lead carbonate pigment which comprises forming an aqueous solution of PbO containing 0.5 to 5.0 percent lead in a water-soluble organic acid having the general formula—

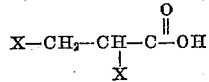

where X is a member from the group consisting of hydrogen, methyl, and halogen, said solution containing water substantially free of organic contaminants and having a hardness less than 100 p.p.m. as calcium carbonate, filtering said solution to remove any solid material suspended therein and then passing carbon dioxide gas through the agitated solution maintained between 20° C. and 30° C. until the pH thereof falls to a value of about 6.5, thereby precipitating basic lead carbonate in the form of hexagonal crystal platelets, washing said crystals with a water-miscible solvent for lead salts of said organic acids, dehydrating the said crystals and then suspending said crystals in an organic vehicle, the said crystals forming a pigment having a luster at least as great as that of natural pearl essence and between about 650 and 1000 as determined by a standard dipping test in a nitrocellulose-containing dipping lacquer.

References Cited in the file of this patent

UNITED STATES PATENTS

| | | |
|---|---|---|
| 2,070,213 | Mitchell | Feb. 9, 1937 |
| 2,097,269 | Brossman | Oct. 26, 1937 |
| 2,218,940 | Thompson et al. | Oct. 22, 1940 |
| 2,363,570 | Cuprio | Nov. 28, 1944 |
| 2,713,004 | Greenstein | July 12, 1955 |
| 2,807,858 | Livingston | Oct. 1, 1957 |

FOREIGN PATENTS

| | | |
|---|---|---|
| 290,844 | Great Britain | May 24, 1928 |